United States Patent [19]
Cheng

[11] Patent Number: 5,721,599
[45] Date of Patent: Feb. 24, 1998

[54] BLACK MATRIX FOR LIQUID CRYSTAL DISPLAY

[75] Inventor: Jia-Shyong Cheng, Hsin-Chun, Taiwan

[73] Assignee: Industrial Technology Research Institute, Hsinchu, Taiwan

[21] Appl. No.: 586,535

[22] Filed: Jan. 16, 1996

[51] Int. Cl.$^6$ .................. G02F 1/1335; G02F 1/1343
[52] U.S. Cl. .................. 349/106; 349/111; 349/139; 349/122; 430/7
[58] Field of Search .................. 359/67, 68, 885, 359/891, 892, 900; 430/7, 20, 321; 349/106, 110, 111, 122, 138, 187, 139

[56] References Cited

U.S. PATENT DOCUMENTS

| 5,329,389 | 7/1994 | Nishida et al. | 339/66 |
| 5,414,442 | 5/1995 | Yamazaki et al. | 345/189 |

FOREIGN PATENT DOCUMENTS

| 0509827 | 10/1992 | European Pat. Off. | 349/106 |
| 6429818 | 1/1989 | Japan | 359/68 |
| 4268533 | 9/1992 | Japan | 359/68 |

OTHER PUBLICATIONS

Koseki et al. "Color filter for 10.4-in-diagonal 4096-color-thin-film transistor liquid crystal displays" IBM J. Res. Develop. vol. 36—No. 1—Jan. 1992.
"Progress In Color Filers for LCDs" by M. Tani et al. Published in Toppan Printing Co, Ltd. (No Date Provided).
"An Analysis of Source-Common Coupling Effect in Large-Area TST-LCDs" by S. Yachi et al. in SID '91 Digest Paper 4.6 P. 30-33-No Date Provided.

Primary Examiner—William L. Sikes
Assistant Examiner—Tai V. Duong
Attorney, Agent, or Firm—George O. Saile; Stephen B. Ackerman

[57] ABSTRACT

The electric circuit of a Liquid Crystal Display normally includes a common electrode comprising a material such as indium-tin-oxide that has high resistivity and hence high series resistance. Said series resistance is significantly reduced by the design taught in the present invention wherein an electrically conductive black matrix is located so as to be in contact with the common electrode. Additionally, said design reduces the level of light reflected back in the direction of viewing, thereby improving the contrast level of the display.

11 Claims, 3 Drawing Sheets

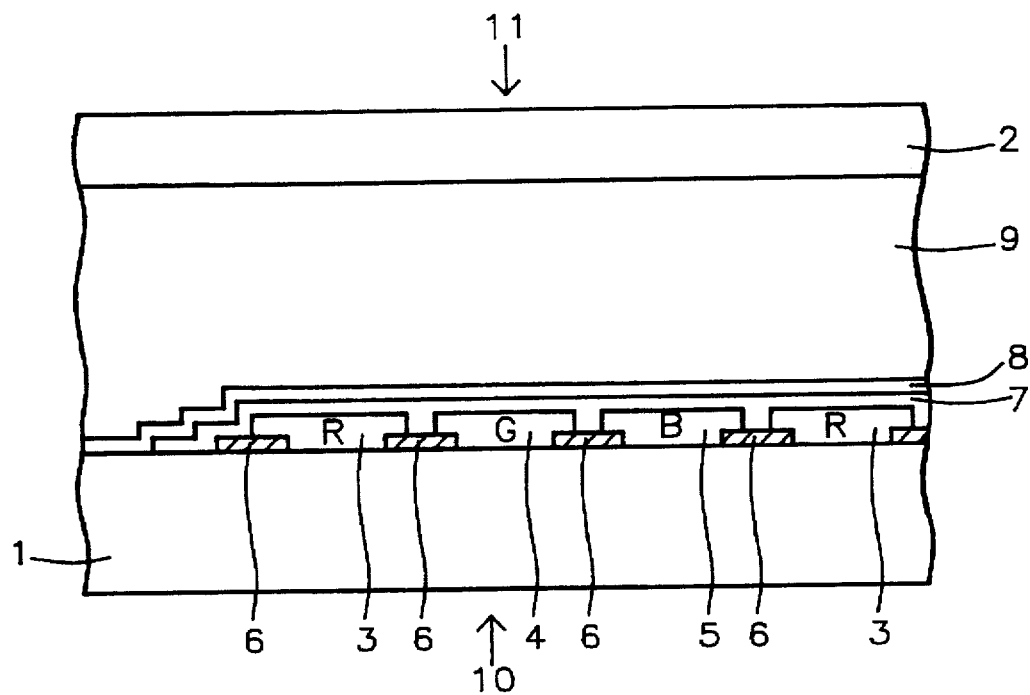
FIG. 1 – Prior Art
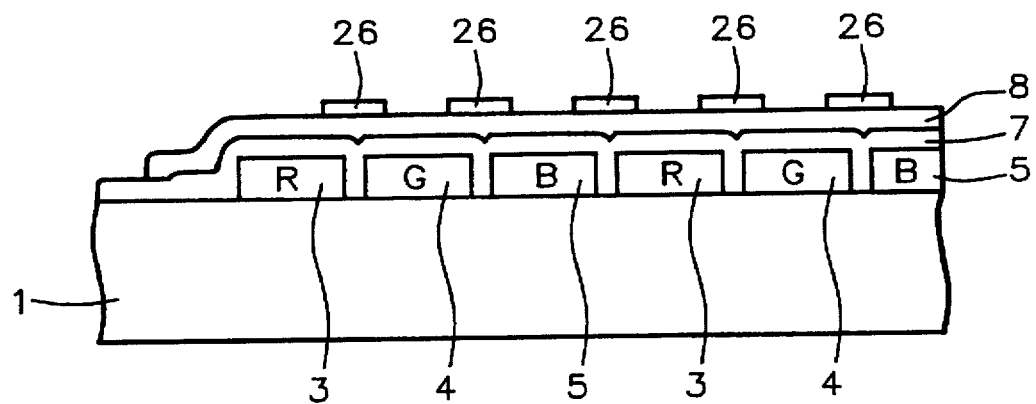
FIG. 2

BLACK MATRIX FOR LIQUID CRYSTAL DISPLAY

BACKGROUND OF THE INVENTION

(1) Field of the Invention

The invention relates to the general field of Liquid Crystal Displays, more particularly to the design of the black matrix.

(2) Description of the Prior Art

Referring to FIG. 1, the basic parts of a liquid crystal display are schematically illustrated in cross-section. A number of layers are involved, the outermost being a pair of polarizers (not shown). In their most commonly used configuration, the polarizers are arranged so as to have their optic axes orthogonal to one another. That is, in the absence of anything else between them, light passing through the entrance polarizer would be blocked by the exit polarizer, and vice versa.

Immediately below the entrance polarizer is an upper transparent insulating substrate 2 (usually glass) and immediately above the exit polarizer is a similar lower substrate 1. Conducting lines (also not shown), running orthogonal to, and insulated from, one another are located on the lower surface of 2. Said orthogonal lines are connected at their intersections through Thin Film Transistors (TFTs). The TFTs allow voltage, separately applied to a set of orthogonal lines, to be added together only at the intersecting position which will overlie a given pixel (or sub-pixel) of the display.

Sandwiched between, and confined there by means of suitable enclosing walls (not shown), is a layer of liquid crystal. Liquid crystals comprise long molecules, called nematics. The orientation of these molecules, relative to a given surface can be controlled by coating such a surface with a suitable orientation layer (not shown) and rubbing said orientation layer in the desired direction just prior to bringing it into contact with the liquid crystals.

Thus, in FIG. 1, the molecules closest to upper substrate 2 might be oriented so as to lie in the plane of the figure while the molecules closest to lower substrate 1 would be oriented to lie perpendicular to this plane. Molecules in between the two sets of pre-oriented molecules then arrange themselves so as to gradually change their orientations between these two extremes. Hence the term 'twisted nematic' (TN) for such a configuration. A TN is optically active and will rotate the plane of any polarized light that traverses it.

Thus, polarized light that was formed and oriented as a result of passing through an entrance polarizer will be rotated though an angle of 90° after traversing layer 9 and so will be correctly oriented to pass through the exit polarizer. Such a device is therefore normally on (transmits light).

An important property of TN is that, in the presence of an electric field (typically about 10 kV/cm.), normal to the molecules, said molecules will all orient themselves so as to point in the same direction and the liquid crystal layer will cease to be optically active. As discussed above, a single pair of orthogonal lines comprise one electrode for generating said electric field, the other being transparent conducting common electrode 8, comprising indium-tin-oxide (ITO). Located between common electrode 8 and the sub-pixels is overcoat layer 7.

To view a display of the type illustrated in FIG. 1, light may be applied from above the entrance polarizer, in direction 11, and then viewed from below the exit polarizer or a reflecting surface may be applied to the lower surface of the exit polarizer and the device viewed from above.

At the present time colored LCDs are built in the same way as monochrome LCDs but their light has been passed through multicolor filters. The latter consists of a matrix of sub-pixel size regions, such as 3, 4, or 5 in FIG. 1, on common substrate 1, each region being a tiny single filter. The spatial locations of the different colored regions are known to the liquid crystal display control system which determines the amount of light that is allowed to pass beyond any given dot, thereby creating a color image. For example, in FIG. 1, region 3 might represent a green filter, region 4 a blue filter, and region 5 a red filter.

One of the ways in which multicolor filters are manufactured is by using a light sensitive resin (such as a methacrylate polymer) as the material out of which the aforementioned dots are formed. Such a resin can be made to serve as a light filtering medium by dispersing an appropriate pigment within it. Then, by using a mask when exposing such a resin to the appropriate actinic radiation, any desired pattern of sub-pixel-sized regions of a given color can be produced.

An important feature of LCDs is the black matrix, a cross-section of which has been designated 6 in FIG. 1. As can be seen, it is located at the spaces between the sub-pixels (such as 3, 4, or 5). Its purpose is to block light that is extraneous to the display that would otherwise emerge on the viewing side of substrate 1, and thereby reduce the overall contrast.

Note that said extraneous light is of two sorts. One sort is the light coming from direction 11. This is relatively easy to block. The other sort of extraneous light originates from direction 10, that is from the direction of viewing, and is the result of reflection from the underside of 6. Effective ways of dealing with undesired light of this sort are among the objects of the present invention.

A separate problem, unrelated to the form or design of the black matrix, concerns a type of signal distortion that is associated with LCDs. S. Yachi et al. have shown, in a paper entitled 'An analysis of source-common coupling effects in large-area TFT-LCDs' published in SID 91 Digest, paper 4–6 pp. 30–33, that this type of distortion can be reduced by reducing the series resistance of the common electrode (8 in FIG. 1).

SUMMARY OF THE INVENTION

It has been an object of the present invention to provide a Liquid Crystal Display having improved contrast relative to similar displays based on the current art.

A further object of the present invention has been to provide a Liquid Crystal Display wherein distortion resulting from source-common coupling effects has been reduced to a minimum.

Yet another object of the present invention has been to provide a cost effective method for manufacturing a Liquid Crystal Display having the above-mentioned properties.

These objects have been achieved by placing an electrically conductive black matrix in contact with the transparent conductive common electrode. The latter normally comprises a material such as indium-tin-oxide having high resistivity and hence high series resistance in the LCD driver circuit. Said series resistance is significantly reduced by the design taught in the present invention. Additionally, said design reduces the level of light reflected back in the direction of viewing, thereby improving the contrast level of the display.

BRIEF DESCRIPTION OF THE DRAWINGS

FIG. 1 is a schematic cross-section of part of a Liquid Crystal Display exemplifying the current art.

FIGS. 2 and 3 are schematic cross-section of parts of a Liquid Crystal Display illustrating two embodiments of the present invention.

DESCRIPTION OF THE PREFERRED EMBODIMENTS

Figure 3:
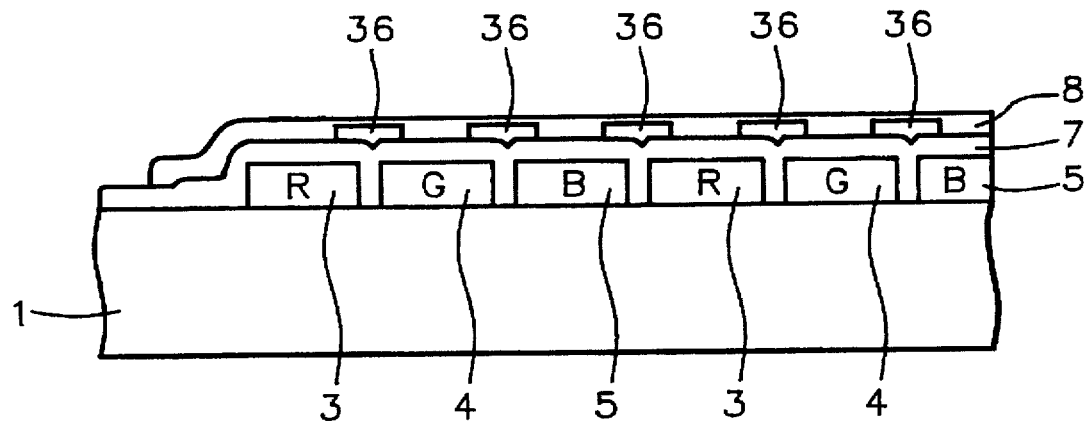

Referring now to FIG. 2, we show there a schematic cross-section of a first embodiment of the present invention. For ease of reference, we have retained the same numbers for some of the sub-components as were used in FIG. 1, since these have not been changed. It is in the manner of their arrangement relative to one another wherein lies the novelty of the present invention.

Sub-pixels 3, 4, and 5, comprising small color filters for, for example, green, blue and red light, are evenly distributed over the surface of transparent insulating substrate 1 and are covered by overcoat layer 7 comprising transparent polyimide or polymer. The thickness of overcoat layer 7 is typically between about 0.5 and 2 microns. Common electrode 8, comprising ITO, has been deposited over layer 7 to a thickness that is between about 500 and 3,000 Angstroms.

Black matrix 26, comprising a layer of chromium between about 500 and 3,000 Angstrom units thick, has been formed over layer 8. Said black matrix has been patterned and etched so as to leave the sub-pixels essentially uncovered, while covering the areas that separate the sub-pixels one from another. The complete LCD includes additional structures such as an upper substrate on whose lower surface have been formed the means for generating an electric field normal to said lower surface and confining it to a single sub-pixel, a layer of liquid crystal between the two substrates, and entrance and exit polarizers.

Referring now to FIG. 3, we show there a schematic cross-section of a second embodiment of the present invention. Sub-pixels 3, 4, and 5, comprising small color filters for, for example, green, blue and red light, are evenly distributed over the surface of transparent insulating substrate 1 and are covered by overcoat layer 7 comprising transparent polyimide or polymer. The thickness of overcoat layer 7 is typically between about 0.5 and 2 microns.

Black matrix 36, comprising a layer of chromium between about 500 and 3,000 Angstrom units thick, has been formed over layer 7. Said black matrix has been patterned and etched so as to leave the sub-pixels essentially uncovered, while covering the areas that separate the sub-pixels one from another. Common electrode 8, comprising ITO, has been deposited over layer 7 and black matrix 36 to a thickness that is between about 500 and 3,000 Angstroms. The complete LCD includes additional structures such as an upper substrate on whose lower surface have been formed the means for generating an electric field normal to said lower surface and confining it to a single sub-pixel, a layer of liquid crystal between the two substrates, and entrance and exit polarizers.

The two embodiments that have just been described above offer several advantages over prior art structures such as that shown in FIG. 1. It will be seen that the black matrix, which comprises the electrical conductor chromium, is embedded within common electrode 8. Since the latter serves as a transparent conductor it must, pending the discovery of a low resistivity transparent conductor, have high electrical resistance. For indium tin oxide the resistivity is about 300 microhm-cms. This resistivity is significantly reduced by the presence of the chromium matrix to an effective value of about 20 microhm-cm. This in turn reduces the source-common coupling distortion effects previously discussed.

Figure 4:
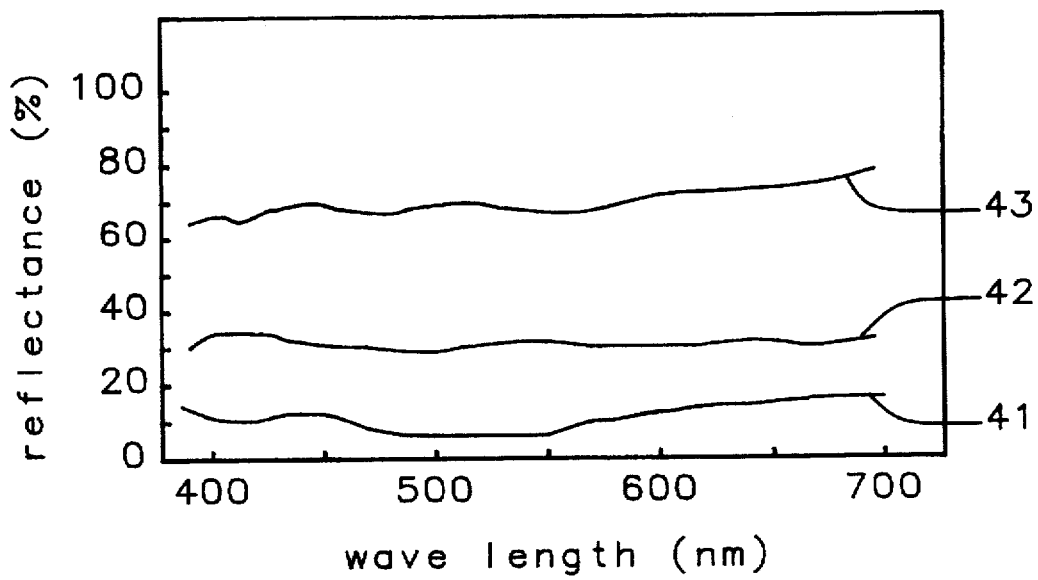
FIG. 4 shows three curves of reflectance vs. wavelength for three different interfaces.

The design of the present invention also helps to mitigate the undesired reflective effects discussed above. The black matrix serves to block light from the TFT and to prevent contrast ratio reduction due to light leakage from a non-display area. Hitherto, chromium has been the most widely used black matrix material. But chromium has a high reflectance around 70% (see curve 41 in FIG. 4a). If used as a black matrix in a TFT-LCD panel having a 50% aperture ratio, the reflectance is reduced to about 35% (see curve 42 in FIG. 4). In the prior art, to achieve lower reflection, a two layer black matrix comprising Cr/CrOx has been used. This lowers the reflectance by a factor of about 4 to about 9% (see curve 43 in FIG. 4). However, this results in an increase in the process cost of about 25%.

In the present invention, as seen in FIG. 2, the color filter, overcoat layer and ITO film are located under the black matrix. So, when environmental light reaches the black matrix and gets reflected it will have passed, in both directions, through these layers. The color filter will absorb most of the light as the pigment scatters it.

Figure 5A:
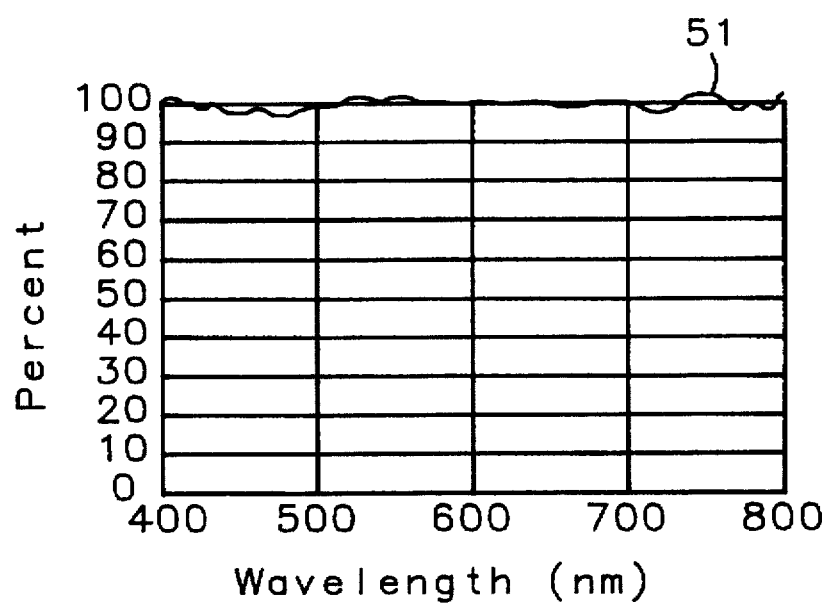
FIG. 5a shows a normalized curve of reflectance vs. wavelength for a prior art structure.
Figure 5B:
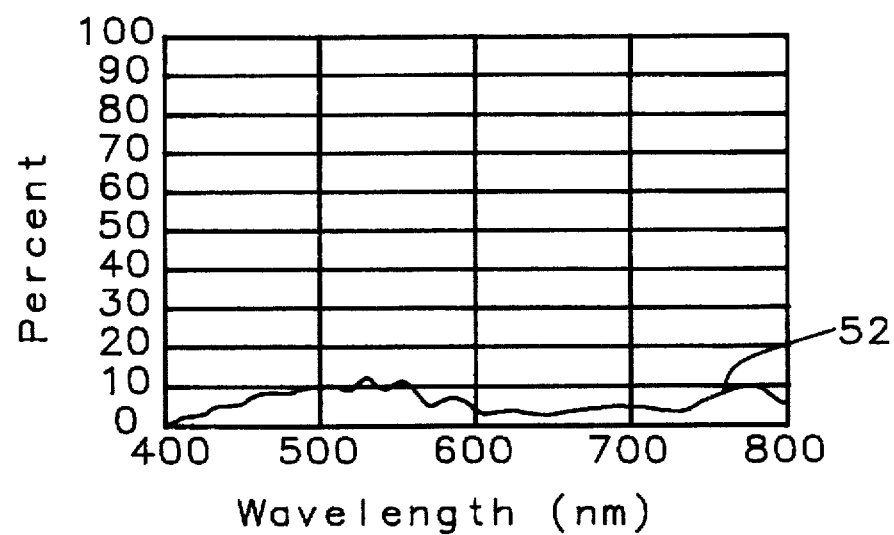
FIG. 5b shows a curve, similar to FIG. 5a but based on the present invention.

The multi-layer structure comprising the overcoat, ITO, and black matrix will also reduce the reflectance to some extent. Beyond that, reflection at the glass-color filter interface is very low because the refractive index of the latter (about 1.5 to 1.7) is similar to that of the glass (about 1.5). This is illustrated in FIGS. 5. Curve 51 in FIG. 5a shows the (normalized) reflectance typical of a single layer structure of the prior art such as the one shown in FIG. 1. Curve 52 in FIG. 5b shows the reflectance of a device made according to the teachings of the present invention, normalized for comparison with 5a. These experimental results show that an improvement in the reflectance by a factor greater than 10 is obtained, without the need to introduce additional steps into the manufacturing process.

We describe now an effective method for manufacturing the above described structures:

Referring once again to FIG. 2, transparent insulating substrate 1 (usually glass) is coated (for example, by spin coating) with a layer of a photosensitive resin in which a colored pigment, for example green, has been dispersed. Then, using standard photolithographic techniques, sub-pixel-sized regions 3 are formed by selectively developing said photosensitive resin. This is repeated twice more using different colored pigments, such as blue and red for example, to form additional sub-pixel areas 4 and 5. It will be understood by those skilled in the art that different sets of sub-pixel-sized regions of resin in which different colored pigments have been dispersed could have been used without departing from the spirit of the present invention. Note that, as seen in FIG. 2, there is a separation area between each of the sub-pixel-sized regions. By means of photolithographic techniques, the separation area can be controlled to be less than 5 microns smaller than the black matrix area.

Once the sub-pixel-sized regions have been formed, an overcoat layer 7 comprising transparent polyimide or polymer is deposited to a thickness between about 0.5 and 2 microns so as to cover both the sub-pixels as well as the separation areas between them. This is followed by the deposition of a transparent, electrically conductive, layer 8 of ITO to a thickness between about 500 and 3,000 Angstrom units.

A layer of chromium, to a thickness between about 500 and 3,000 Angstrom units, is then deposited over layer 7 and selectively etched, using standard photolithographic technique, to form black matrix 26. Said black matrix covers the separation areas between the sub-pixels while leaving the sub-pixels themselves essentially uncovered.

Formation of the full LCD may now be completed by adding additional structures such as an upper substrate on whose lower surface has been formed the means for generating an electric field normal to said lower surface and confined to a single sub-pixel, a layer of liquid crystal between the two substrates, and entrance and exit polarizers.

As a variation on the above-described method, the black matrix (see 36 in FIG. 3) may be formed on the surface of overcoat 7 following which transparent conducting layer 8 gets deposited. A further reduction in process cost for the structures seen in FIGS. 2 and 3 can be achieved if the overcoat layer is eliminated.

While the invention has been particularly shown and described with reference to the preferred embodiments thereof, it will be understood by those skilled in the art that various changes in form and details may be made without departing from the spirit and scope of the invention.

What is claimed is:

1. A liquid crystal display having reduced common electrode resistance comprising:

two polarizers;

upper and lower substrates, each having upper and lower surfaces, between said polarizers;

an array of sub-pixel-sized color filters, separated one from another by a separation area, on the upper surface of said lower substrate;

an overcoat layer over said array of color filters and said upper surface of said lower substrate;

a black matrix on said overcoat layer;

a layer of transparent, electrically conductive, material on said overcoat layer and embedding said black matrix; said transparent conductive layer having a thickness greater than that of said black matrix;

means, on the lower surface of said upper substrate, for applying an electric field normal to any one of said color filters; and a layer of liquid crystal confined between said upper and lower substrates.

2. The structure of claim 1 wherein said black matrix comprises a layer of material taken from the group consisting of chromium, titanium, molybdenum, nickel, tantalum, tungsten, and aluminum, patterned and etched so as to leave said color filters essentially uncovered and said separation area covered.

3. The structure of claim 1 wherein each color filter filters red, green, or blue light.

4. The structure of claim 1 wherein said layer of transparent, electrically conductive, material comprises indium tin oxide or indium oxide or tin oxide.

5. The structure of claim 1 wherein said overcoat layer comprises transparent polyimide or silicon oxide or silicon nitride.

6. A method for making a black matrix in a liquid crystal display comprising:

(a) providing a transparent insulating substrate having an upper surface;

(b) coating said upper surface with a layer of a photosensitive resin in which a colored pigment has been dispersed;

(c) selectively exposing sub-pixel-sized regions of said photosensitive resin, there being a separation area between said regions, to ultraviolet light and then removing all unexposed regions of said resin layer;

(d) coating said upper surface, including any exposed resin, with a layer of photosensitive resin in which has been dispersed a pigment of a color different from any already present on said upper surface, and then repeating step (c);

(e) repeating step (d) one or more times;

(f) depositing an overcoat layer;

(g) depositing a layer of chromium;

(h) selectively etching said layer of chromium so as to leave said pixel-sized regions uncovered and said separation area covered; and (i) depositing a transparent, electrically conductive, layer embeds the etched chromium; said transparent conductive layer having a thickness greater than that of said etched chromium.

7. The method of claim 6 wherein red, green, and blue pigments are used.

8. The method of claim 6 wherein said layer of transparent, electrically conductive material comprises indium tin oxide deposited to a thickness between about 1,000 and about 3,000 Angstroms.

9. The method of claim 6 wherein said overcoat layer comprises transparent polyimide or polymer deposited to a thickness between 0 and about 2 microns.

10. The method of claim 6 wherein said layer of photosensitive resin is applied by means of spin coating.

11. The method of claim 6 wherein the layer of chromium is deposited to a thickness between about 500 and 2,800 Angstroms.

* * * * *

(12) EX PARTE REEXAMINATION CERTIFICATE (9986th)
United States Patent
Cheng

(10) Patent Number: US 5,721,599 C1
(45) Certificate Issued: Dec. 17, 2013

(54) BLACK MATRIX FOR LIQUID CRYSTAL DISPLAY

(75) Inventor: Jin-Shyong Cheng, Hsin-Chun (TW)

(73) Assignee: Industrial Technology Research Institute, Chutung Town, Hsinchu Hsien (TW)

Reexamination Request:
No. 90/012,472, Sep. 6, 2012

Reexamination Certificate for:
Patent No.: 5,721,599
Issued: Feb. 24, 1998
Appl. No.: 08/586,535
Filed: Jan. 16, 1996

(51) Int. Cl.
*G02F 1/1335* (2006.01)
*G02F 1/1343* (2006.01)

(52) U.S. Cl.
USPC ........... 349/106; 349/111; 349/122; 349/139; 430/7

(58) Field of Classification Search
None
See application file for complete search history.

(56) References Cited

To view the complete listing of prior art documents cited during the proceeding for Reexamination Control Number 90/012,472, please refer to the USPTO's public Patent Application Information Retrieval (PAIR) system under the Display References tab.

*Primary Examiner* — Minh Nguyen

(57) ABSTRACT

The electric circuit of a Liquid Crystal Display normally includes a common electrode comprising a material such as indium-tin-oxide that has high resistivity and hence high series resistance. Said series resistance is significantly reduced by the design taught in the present invention wherein an electrically conductive black matrix is located so as to be in contact with the common electrode. Additionally, said design reduces the level of light reflected back in the direction of viewing, thereby improving the contrast level of the display.

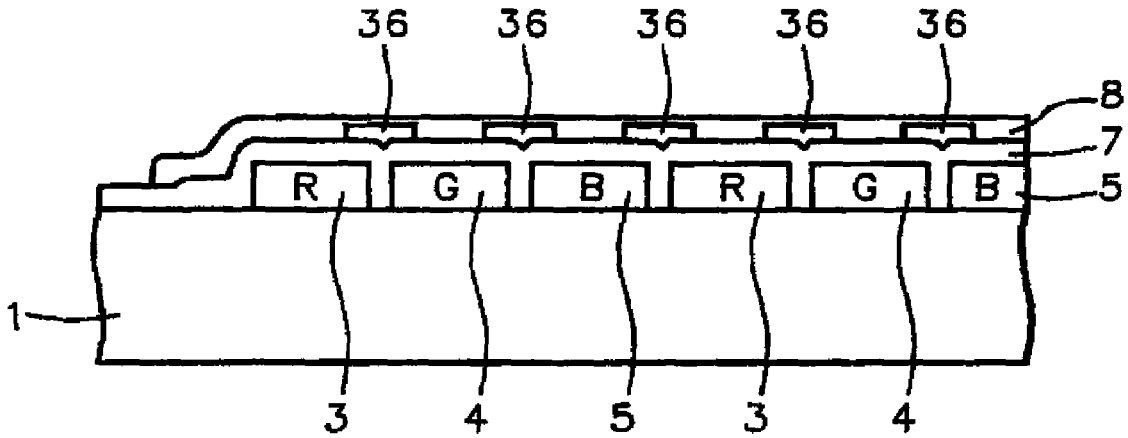

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 3 are cancelled.

Claims 2 and 4-11 were not reexamined.

\* \* \* \* \*